United States Patent Office.

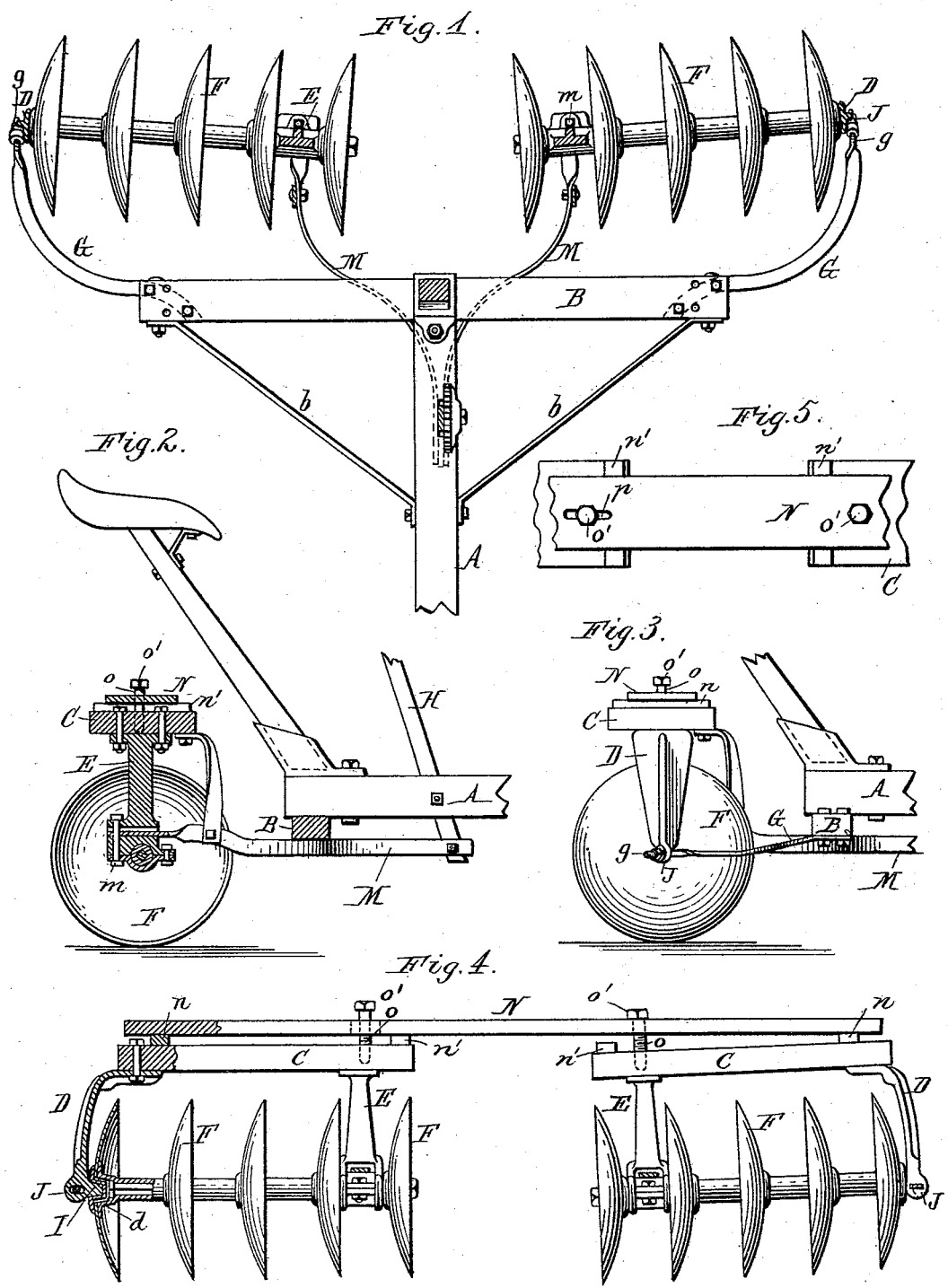

ALBERT J. GLASS, OF BATAVIA, NEW YORK, ASSIGNOR TO THE JOHNSTON HARVESTER COMPANY, OF SAME PLACE.

DISK HARROW.

SPECIFICATION forming part of Letters Patent No. 498,428, dated May 30, 1893.

Application filed June 26, 1891. Serial No. 397,569. (No model.)

*To all whom it may concern:*

Be it known that I, ALBERT J. GLASS, a citizen of the United States, residing at Batavia, in the county of Genesee and State of New York, have invented new and useful Improvements in Disk Harrows, of which the following is a specification.

This invention relates to a disk harrow in which the gang planks are provided at their inner ends with bearings having lugs arranged one in front of the other and a draft rod provided with a longitudinal coupling bolt which passes through said lugs. A harrow of this description is described and claimed in Letters Patent of the United States No. 449,871, granted April 7, 1891, to G. G. Crowley, assignor, &c.

One object of my improvements is to render the disk gangs reversible or interchangeable so that they can be readily arranged to throw the earth inwardly instead of outwardly.

Another object of my improvements is to limit the dropping movement of the inner ends of the disk gangs.

In the accompanying drawings, Figure 1 is a sectional top plan view of my improved harrow, the gang planks and seat being removed. Fig. 2 is a longitudinal sectional elevation of the same. Fig. 3 is a fragmentary end elevation of the same. Fig. 4 is a front elevation, partly in section. Fig. 5 is a top plan view of the adjacent inner portions of the gang planks.

Like letters of reference refer to like parts in the several figures.

A represents the pole, B the cross bar of the draft frame and *b* the braces connecting the pole with the cross bar.

C C represent the gang planks, D D the outer bearings, E E the inner bearings and F the disks.

The outer bearings D are provided on the inner sides of their lower ends with studs I which enter cavities in the thimbles *d* at the inner ends of the disk gangs and on which the gangs turn. Cup-shaped bushings are preferably interposed between the thimbles and the studs to reduce the wear. The outer bearings D are each provided at the outer side of its lower end with a perforated lug J. The two lugs of the two bearings stand one behind the other when the gangs are reversed or interchanged, so that the bearings D form the inner bearings, as represented in the Letters Patent above referred to.

G represents the outer draft rods or brackets which are rigidly attached with their front ends to the cross bar B of the draft frame. These draft rods extend outwardly and rearwardly from the ends of the cross bar B and are provided at their rear ends with longitudinal bolts *g* which pass through the lugs and carry screw nuts on the rear sides of said lugs. The openings in the lugs are made flaring to permit the angle of the gangs to be changed.

M represents the inner draft rods which are attached with their front ends to the adjusting or hand lever H mounted on the pole. These draft rods are pivoted with their rear ends to the inner bearings E of the disk gangs by vertical bolts *m*, arranged preferably in rear of the gang axle. Each bearing E is provided above the gang axle with a forwardly flaring recess in which the rear portion of the inner draft rod plays.

The outer and inner bearings of this harrow are constructed precisely like the inner and outer bearings of the harrow described in the Crowley patent above referred to, but in that patent the gangs are so arranged that the bearings D are located at the adjacent inner ends of the gangs and the lugs of these bearings are connected to a single central draft rod. In this arrangement of the gangs the concave sides of the disks are turned outwardly and the earth is thrown outwardly. In my improved construction the two gangs of the said Crowley harrow are interchanged so that the bearings D are located at the outer ends of the gangs and the concave sides of the disks are turned inwardly whereby the earth is thrown inwardly. Each bearing is connected by a separate outer draft rod with the gang frame. This arrangement of the gangs and draft rods throws the weight of the pole and connections as well as the weight of the driver by means of the outer rigid brackets on the extreme outer ends of the disk gangs and retains the outer ends of the disk gangs in a fixed relation to the pole and thereby counteracts the tendency of the outer disks to run shallower or enter the earth to a less depth than the inner disks in hard land.

In vineyards and orchards the earth is thrown outwardly in the fall to cover the roots and inwardly in the spring to expose the roots to the sun and to fill up the ditch, while during the summer the earth is thrown alternately inwardly and outwardly in cultivating the land. By providing for each harrow a set of the draft rods described and shown herein and an additional set of the construction described and shown in the Crowley patent above referred to, the gangs can be used with either end outward so as to throw the earth in either direction, at desire. The draft frame is provided with the necessary bolt holes for attaching either set of draft rods.

When the disks are arranged with their concave sides inwardly, as represented in Fig. 1, so as to throw the earth inwardly, the gangs have a tendency to enter the earth deeper at their inner ends than at their outer ends. In order to prevent an excessive downward movement of the inner ends of the gangs, the following device is used:

N represents a cross bar placed upon both gangs and resting with its ends upon the outer ends of the gang planks which latter are provided on their upper sides and near their outer and inner ends with raised strips $n$ $n'$ upon which the cross bar rests. $o$ represents bolts which are secured with their lower ends in the gang planks near the inner ends thereof and which project upwardly through the cross bar and are provided at a suitable distance above the latter with heads or stops $o'$ which limit the downward movement of the inner end of each gang by coming in contact with the upper side of the cross bar. These heads are arranged at such a distance above the cross bar that they allow the necessary vertical play to the gangs to enable the same to follow the undulations of the ground, but not so high as to admit of an excessive dropping movement of the inner ends of the gangs. One of the bolts passes through a transverse slot $p$ in the cross bar in order to permit the gangs to move toward and from each other to a limited extent in adjusting the angle of the gangs by the hand lever and in moving over the ground.

I claim as my invention—

1. The combination with the draft frame, and the gang planks and disk gangs arranged in rear thereof, of bearings secured to the outer ends of the gang planks and supporting the disk gangs outside of the outer disks, draft rods rigidly secured to the sides of the draft frame and extending rearwardly therefrom to said outer bearings of the disk gangs, and adjusting rods connected with the inner portions of the disk gangs, whereby the weight of the draft frame and driver is thrown upon the extreme outer ends of the disk gangs, substantially as set forth.

2. The combination with the draft frame, and the gang planks and disk gangs arranged in rear thereof, of bearings provided with longitudinally perforated lugs, and secured to the outer ends of the gang planks and supporting the disk gangs outside of the outer disks, draft rods secured rigidly with their front ends to the sides of the draft frame and provided at their rear ends with longitudinal bolts engaging in the perforations of the outer bearings, and adjusting rods connected with the inner portions of the disk gangs, substantially as set forth.

3. The combination with the draft frame, and the gang planks and disk gangs arranged in rear of the draft frame, of a cross bar resting upon the outer ends of both gang planks, and upright connections whereby the inner ends of the gang planks are attached to said cross bar and permitted to have a limited vertical movement with reference to the same, substantially as set forth.

4. The combination with the draft frame, and the gang planks and disk gangs arranged in rear of the draft frame, of a cross bar resting upon the outer ends of both gang planks, and upright bolts secured to the inner ends of the gang planks and provided above the cross bar with stops which limit the downward movement of the inner ends of the gang planks, substantially as set forth.

Witness my hand this 23d day of June, 1891.

ALBERT J. GLASS.

Witnesses:
LEWIS D. COLLINS,
GEO. O. VALZ.